United States Patent
Takayama et al.

[11] Patent Number: 5,928,358
[45] Date of Patent: Jul. 27, 1999

[54] INFORMATION PROCESSING APPARATUS WHICH ACCURATELY PREDICTS WHETHER A BRANCH IS TAKEN FOR A CONDITIONAL BRANCH INSTRUCTION, USING SMALL-SCALE HARDWARE

[75] Inventors: Shuichi Takayama, Takarazuka; Nobuo Higaki, Osaka, both of Japan

[73] Assignee: Matsushita Electric Industrial Co., Ltd., Osaka, Japan

[21] Appl. No.: 08/987,260

[22] Filed: Dec. 9, 1997

[30] Foreign Application Priority Data

Dec. 9, 1996  [JP]  Japan ................................. 8-328457

[51] Int. Cl.$^6$ ....................................................... G06F 9/40
[52] U.S. Cl. ............................................................ 712/239
[58] Field of Search ...................................... 712/239, 240

[56] References Cited

U.S. PATENT DOCUMENTS

| | | | |
|---|---|---|---|
| 5,817,699 | 9/1998 | Puziol et al. ............................. | 395/586 |
| 5,822,575 | 10/1998 | Tran et al. ................................ | 395/586 |
| 5,828,874 | 10/1998 | Steedy et al. ............................ | 395/587 |
| 5,848,269 | 12/1998 | Hara ......................................... | 395/586 |
| 5,864,697 | 1/1999 | Shiell ....................................... | 395/587 |

FOREIGN PATENT DOCUMENTS

| | | |
|---|---|---|
| 0081357 | 12/1982 | European Pat. Off. . |
| 0423726 | 10/1990 | European Pat. Off. . |
| 63-75934 | 4/1988 | Japan . |

*Primary Examiner*—David Y. Eng
*Attorney, Agent, or Firm*—Price Gess & Ubell

[57] ABSTRACT

A branch instruction includes a set of branch prediction information 13b and a set of branch history information 13c. The set of branch prediction information 13b is made up of 1 bit which predicts whether a branch will be performed during the next execution of the instruction. The set of branch history information 13c is made up of 2 bits showing a frequency, with which the branch has been taken, is "very high", "high", "low" or "very low". An instruction fetching unit 12 prefetches an instruction from a cache memory 11a in accordance with the set of branch prediction information 13b. After an instruction executing unit 15 completes an execution of the branch instruction, a branch history information generating unit 16 generates a new set of branch history information and a branch prediction information generating unit 17 generates a new set of branch prediction information, in accordance with the execution result and the preceding branch history information 13c. A branch instruction updating unit 18 overwrites the generated set of branch history information and the generated set of branch prediction information on the corresponding branch instruction stored in the main memory 11a.

23 Claims, 14 Drawing Sheets

FIG. 4

| INPUT VALUE | | OUTPUT VALUE | |
|---|---|---|---|
| BRANCH HISTORY INFORMATION $H_1H_0$ | EXECUTION RESULT X | BRANCH HISTORY INFORMATION $N_1N_0$ | BRANCH PREDICTION INFORMATION F |
| 00 (VERY LOW) | 0 (NOT TAKEN) | – (MAINTAINED) | – (MAINTAINED) |
| | 1 (TAKEN) | 01 (LOW) | – (MAINTAINED) |
| 01 (LOW) | 0 (NOT TAKEN) | 00 (VERY LOW) | 0 (NOT TAKEN) |
| | 1 (TAKEN) | 10 (HIGH) | – (MAINTAINED) |
| 10 (HIGH) | 0 (NOT TAKEN) | 01 (LOW) | – (MAINTAINED) |
| | 1 (TAKEN) | 11 (VERY HIGH) | 1 (TAKEN) |
| 11 (VERY HIGH) | 0 (NOT TAKEN) | 10 (HIGH) | – (MAINTAINED) |
| | 1 (TAKEN) | – (MAINTAINED) | – (MAINTAINED) |

FIG. 13

| INPUT VALUE | | | OUTPUT VALUE | | |
|---|---|---|---|---|---|
| BRANCH HISTORY INFORMATION | | EXECUTION RESULT | BRANCH HISTORY INFORMATION | | BRANCH PREDICTION INFORMATION |
| BRANCH RESULT 2 TIMES BEFORE H1 | PRECEDING BRANCH RESULT H0 | X | BRANCH RESULT 2 TIMES BEFORE N1 | PRECEDING BRANCH RESULT N0 | F |
| 0 | 0 | 0 | 0 | 0 | 0 |
| 0 | 0 | 1 | 0 | 1 | 0 |
| 0 | 1 | 0 | 1 | 0 | 1 |
| 0 | 1 | 1 | 1 | 1 | 1 |
| 1 | 0 | 0 | 0 | 0 | 0 |
| 1 | 0 | 1 | 0 | 1 | 0 |
| 1 | 1 | 0 | 1 | 0 | 1 |
| 1 | 1 | 1 | 1 | 1 | 1 |

INFORMATION PROCESSING APPARATUS WHICH ACCURATELY PREDICTS WHETHER A BRANCH IS TAKEN FOR A CONDITIONAL BRANCH INSTRUCTION, USING SMALL-SCALE HARDWARE

BACKGROUND OF THE INVENTION (1) Field of the Invention

The present invention relates to an information processing apparatus such as a microprocessor, and especially relates to an improved technique of branch prediction.

(2) Description of the Prior Art

For an information processing apparatus such as a microprocessor which uses a pipeline structure, a branch prediction is a method used to suppress the disorder in the pipeline which occurs due to branches in the control flow when executing branch instructions. To perform branch prediction with high accuracy, it is necessary to predict whether a conditional branch (referred to as "a branch" hereafter) is performed for each branch instruction (hereafter, whether a branch is performed or not performed is referred to as "taken" and "not taken"). To do so, a branch prediction table, which is a collection of branch prediction information corresponding to each branch instruction in the programs, can be provided.

When the branch prediction table is stored in an internal memory of the information processing apparatus, it results in an increase in the size of the hardware. For this reason, a branch prediction method which minimizes the required size of the hardware of the information processing apparatus has been proposed (See an information processing apparatus disclosed in Japanese Laid-Open Patent Application No. 63-75934, for example). This method does not store the branch prediction information permanently in the internal memory of the information processing apparatus, but has the branch prediction information provided in the branch instructions themselves.

FIG. 1 shows a branch instruction format of this conventional information processing apparatus. As shown in FIG. 1, 1 bit of branch prediction information 40*b* is provided in a branch instruction 40 and, when decoding the branch instruction 40, the conventional information processing apparatus fetches a next instruction which is to be executed in accordance with the branch prediction information 40*b*. After the execution of the branch instruction 40, the conventional information processing apparatus compares the execution result with the branch prediction information 40*b*, and, when the prediction is incorrect, updates the branch prediction information 40*b* of the branch instruction 40 stored in the memory. By doing so, this information processing apparatus does not need to store the branch prediction table in the internal memory.

Although the required hardware size of the conventional information processing apparatus is reduced, it has a drawback in that the penalties resulting from the failure of the branch prediction are frequently incurred because of the low accuracy of the branch prediction.

In other words, the conventional information processing apparatus prefetches a next instruction in accordance with the 1-bit branch prediction information showing the execution result of the preceding instruction. When, for example, the conditions that a branch is taken are only satisfied during alternate execution, all predictions will be incorrect. Therefore, the prefetched instruction has to be invalidated every time such branch prediction is executed, which prevents the information processing apparatus from processing at high speed.

SUMMARY OF THE INVENTION

In view of the stated problem, it is a primary object of the present invention to provide an information processing apparatus which makes a branch prediction with the high accuracy using small-scale hardware.

It is a secondary object of the present invention to provide a storage medium which stores a program for realizing the information processing apparatus using software, and stores an instruction group including a unique branch instruction for the information processing apparatus.

The object can be achieved by an information processing apparatus to which the present invention relates, the information processing apparatus executes instructions sequentially and is made up of: storage means for storing a instruction group including a branch instruction which possesses a set of branch prediction information for a prediction as to whether a branch is taken or not taken, and a set of branch history information showing a plurality of past branch results; instruction fetching means for fetching an instruction to be executed from the storage means; instruction decoding means for decoding the instruction fetched by the instruction fetching means and judging whether the instruction is the branch instruction; instruction fetch controlling means for controlling, when the fetched instruction is judged to be the branch instruction, the instruction fetching means to fetch an instruction in accordance with the set of branch prediction information of the branch instruction; executing means for executing the decoded branch instruction; branch prediction information generating means for generating a new set of branch prediction information in accordance with a branch result when the branch instruction is executed and the set of branch history information included in the branch instruction; branch history information generating means for generating a new set of branch history information in accordance with a branch result when the branch instruction is executed and the set of branch history information included in the branch instruction; and branch instruction updating means for updating the set of branch prediction information and the set of branch history information of the branch instruction stored in the storage means respectively to the new set of branch prediction information generated by the branch prediction information generating means and the new set of branch history information generated by the branch history information generating means.

In other words, the branch instruction of the information processing apparatus of the present invention includes a set of branch prediction information as well as a set of branch history information showing the past branch results. When the branch instruction is executed, the set of branch prediction information and the set of branch history information of the branch instruction are updated, in consideration of not only the execution result, but also the set of branch history information having been included in the branch instruction.

As a result, an instruction is prefetched in accordance with a branch result for the preceding execution as well as a branch result for two executions previously, so that the branch prediction with higher accuracy than the conventional branch prediction can be performed.

The set of branch prediction information and the set of branch history information are not stored as a branch prediction table permanently in the internal memory of the information processing apparatus, but are assigned to the branch instruction stored in the storage means. Accordingly, the required size of hardware of the information processing apparatus for realizing the branch prediction can be reduced.

The set of branch history information of the information processing apparatus may be a summary of a plurality of past branch results of the branch instruction which possesses the set of branch history information.

Accordingly, the branch history information can reflect the more past branch results using less number of bits than ever, and the disorder of the branch prediction (the decrease in the accuracy) incurred by the exceptional result of the preceding branch can be avoided. As a result, the branch prediction viewed in perspective can be achieved in consideration of more past branch results.

The set of branch history information of the information processing apparatus may show that a frequency, with which the branch corresponding to the branch instruction has been taken, is "very high", "high", "low" or "very low".

The branch history information generating means of the information processing apparatus, when the set of branch history information included in the branch instruction is "very low", "low" or "high", and the branch result was "taken", may generate a new set of branch history information indicating "low", "high" or "very high" respectively corresponding to the set of branch history information, and when the set of branch history information included in the branch instruction indicates "very high", "high" or "low", and the branch result was "not taken", may generate a new set of branch history information indicating "high", "low" or "very low" respectively corresponding to the set of branch history information.

By means of this structure, the statistic summary of more than 3 branch results can be presented in only 2-bit branch history information, for example.

The branch prediction information updating means of the information processing apparatus may generate a new set of branch prediction information indicating "taken" only when the branch history information indicates "high" and the branch result was "taken", and may generate a new set of branch prediction information indicating "not taken" only when the branch history information indicates "low" and the branch result was "not taken".

Accordingly, the branch prediction possessing a hysteresis in the relationship between the branch result history and the branch prediction information is made, so that the accuracy of the prediction is raised as compared with the branch prediction based on the 1-bit branch prediction information, and that the disorder of the branch prediction incurred by the alternate repetition that the branch is "taken" and "not taken" in a short time cycle is avoided.

The branch instruction updating means of the information processing apparatus may generate a new branch instruction which includes a set of branch prediction information generated by the branch prediction information generating means and a set of branch history information generated by the branch history information generating means, and then may overwrite the new branch instruction at a corresponding location in the storage means, wherein the corresponding location stores a source branch instruction of the new branch instruction.

By means of this structure, the branch prediction information and the branch history information of the branch instruction are updated entirely (together with other bits of the branch instruction) so that they are updated in the high-speed process as compared with the process in which the branch instruction is read out from the storage means, updated and rewritten.

The storage means of the information processing apparatus may include: a main storage unit for storing the instruction group; a cache storage unit for storing a part of the instruction group stored in the main storage unit; and a cache control means for keeping consistency between a content of the cache storage unit and a content of the main storage unit. The instruction fetching means may fetch the instruction from the cache storage means, and the branch instruction updating means may update the set of branch prediction information and the set of branch history information of the branch instruction stored in the cache storage means.

As a result, the information processing apparatus of the present invention only has to update the branch instruction stored in the cache memory which can be accessed at high speed, so that the execution speed is accelerated.

The branch prediction information updating means of the information processing apparatus may generate a new set of branch prediction information indicating "taken" only when the branch history information indicates "very high" and the branch result is "taken", and may generate a new set of branch prediction information indicating "not taken" only when the branch history information indicates "very low" and the branch result is "not taken".

By means of this structure, the level of the hysteresis becomes higher, and an information processing apparatus suitable for systems where suppression of disorders in the branch prediction information flow is a high priority is realized.

The set of branch history information of the information processing apparatus may show that a frequency, with which the branch corresponding to the branch instruction is taken, is "high" or "low".

The branch history information generating means of the information processing apparatus may generate a new set of branch prediction information indicating "high" only when the branch history information included in the branch instruction indicates "low" and the branch result is "taken", and may generate a new set of branch prediction information indicating "low" only when the branch history information indicates "high" and the branch result is "not taken".

The branch prediction information updating means of the information processing apparatus may generate a new set of branch prediction information indicating "taken" only when the branch history information indicates "high" and the branch result is "taken", and may generate a new set of branch prediction information indicating "not taken" only when the branch history information indicates "low" and the branch result is "not taken".

By means of these structures, the level of the hysteresis becomes lower, so the branch prediction which is sensitive to the program execution result, that is, the dynamic branch prediction, can be achieved. Also, since the branch history information needs only small number of bits, the instruction set can be defined more freely.

The set of branch history information of the information processing apparatus may show a branch result for each past execution of a branch instruction including the set of branch history information.

The set of branch history information of the information processing apparatus may be made up of 2 bits showing a branch result for a preceding execution and a branch result for two executions previously, and the branch history information generating means may generate a new set of branch history information using branch results at times of executions of the branch instruction.

Accordingly, the branch prediction is performed in accordance with not the summary of a plurality of past branch results, but the latest successive branch results, so that the information processing apparatus which accurately performs the branch prediction in consideration of the exceptional branch result can be realized.

Moreover, the present invention can be realized using not only hardware, but also software. A storage medium may store a program for simulating an operation of a microprocessor that prefetches an instruction by making a branch prediction, the program includes: an instruction fetching step for fetching an instruction to be executed from the storage means that stores the instruction group including a branch instruction composed of a set of branch prediction information for predicting whether the branch is taken or not taken and a set of branch history information showing past branch results; an instruction decoding step for decoding whether the fetched instruction is a branch instruction; a branch prediction step for reading, when the fetched instruction is decoded as a branch instruction, an instruction to be executed in accordance with a set of branch prediction information of the branch instruction; an executing step for executing the decoded branch instruction; a branch prediction information generating step for generating a new set of branch prediction information in accordance with branch results when the branch instruction is executed and a set of branch history information included in the branch instruction; a branch history information generating step for generating a new set of branch history information in accordance with branch results when the branch instructions are executed and a set of branch history information included in the branch instruction; and a branch instruction updating step for updating the set of branch prediction information and the set of branch history information of the branch instruction stored in the storage means to the new set of branch prediction information generated by the branch prediction information generating step and the new set of branch history information generated by the branch history information generating step.

A storage medium may also store an instruction group which is to be executed by a computer, the instruction group may include a branch instruction made up of a set of branch prediction information for predicting whether a branch is taken or not taken and a set of branch history information showing past branch results. The set of branch prediction information may show values generated in accordance with a set of branch history information and a branch result of a branch instruction including the set of branch prediction information at a time of a latest execution by the computer, and the set of branch history information may show values generated in accordance with a set of branch history information and a branch result of a branch instruction including the set of branch history information at a time of a latest execution by the computer, and may be a summary of a plurality of past branch results of the branch instruction.

A storage medium may store an instruction group which is executed by a computer, the instruction group includes a branch instruction composed of a set of branch prediction information for predicting whether a branch is taken or not taken and a set of branch history information showing past branch results. The branch prediction information may show values generated in accordance with a set of branch history information and a branch result of a branch instruction including the set of branch prediction information at a time of a latest execution by the computer, and the set of branch history information may show values generated in accordance with a set of branch history information and a branch result of a branch instruction including the set of branch history information at a time of a latest execution by the computer, and may show a branch result for each past branch corresponding to the branch instruction.

By means of these structures, the secondary object can be achieved.

Accordingly, a high-performance microprocessor, a virtual machine and others which are realized using small-scale hardware or software and perform branch prediction with high accuracy are realized by the present invention, making its practical effect considerable.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 is a truth table showing the input-output relations of the branch history information generating unit 16 and the branch prediction information generating unit 17;

FIG. 13 shows a truth table showing a updated algorithm of the branch history information and the branch prediction information of the branch instruction, to which an information processing apparatus of the modification 3 relates.

DESCRIPTION OF THE PREFERRED EMBODIMENTS

The following is a description of an embodiment of an information processing apparatus of the present invention, with reference to the drawings.

Structure of Information Processing Apparatus

Figure 2:
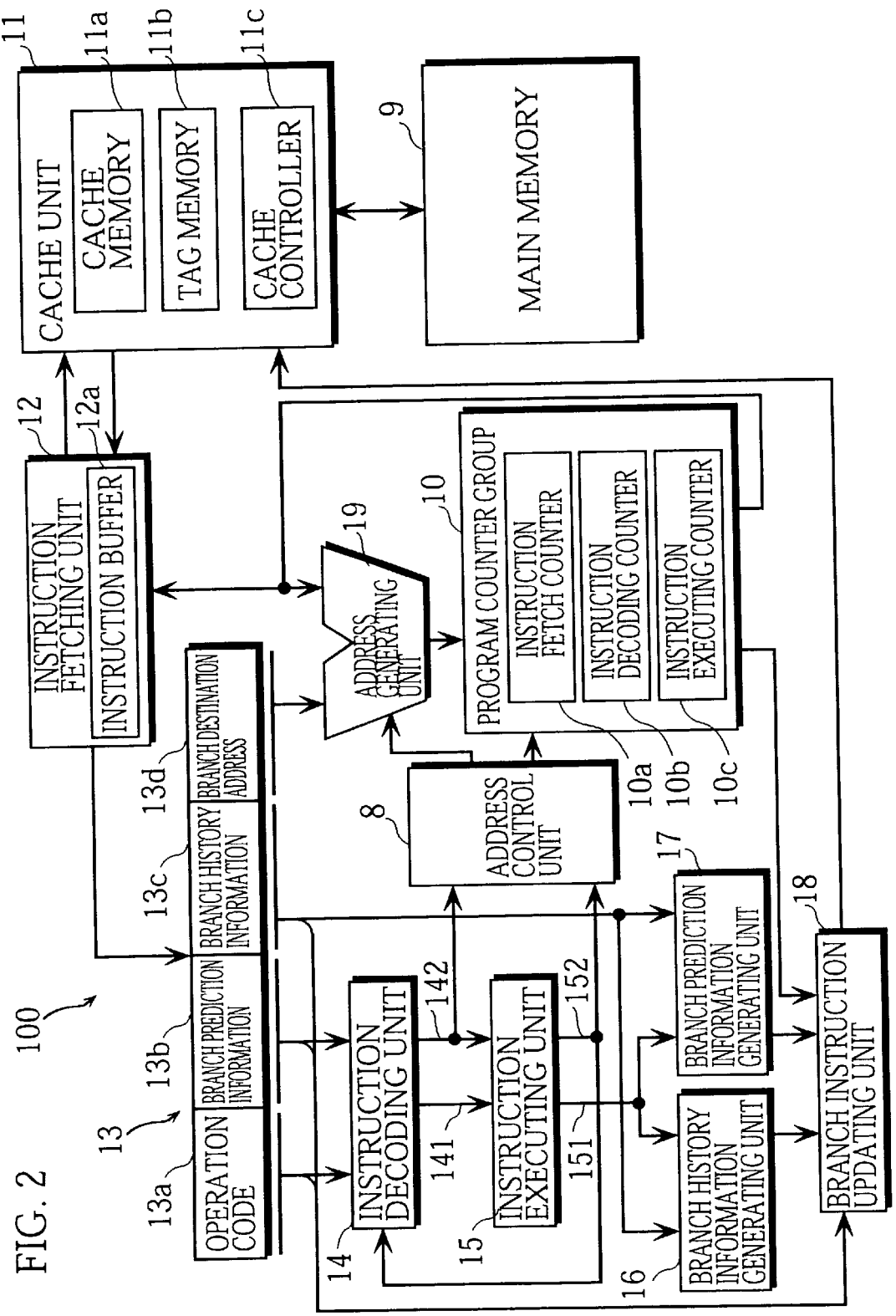
FIG. 2 is a block diagram showing the structure of the information processing apparatus of the present invention.

FIG. 2 is a block diagram showing the structure of an information processing apparatus 100 of the present invention.

The information processing apparatus 100 is a processor system which fetches, decodes, and executes 32-bit fixed length instructions one by one that are stored in advance. The information processing apparatus is composed of a main memory 9, a cache unit 11, an instruction fetching unit 12, an instruction register 13, an instruction decoding unit 14, an instruction executing unit 15, an address control unit 8, a program counter group 10, an address generating unit 19, a branch history information generating unit 16, a branch prediction information generating unit 17 and a branch instruction updating unit 18. Here, these components 8 to 19 are operated in synchronization with a clock signal which is not illustrated.

The components 12 to 18 comprise a 4-stage pipeline as follows: the instruction fetching unit 12 comprises a fetching (IF) stage of the pipeline; the instruction register unit 13 and the instruction decoding unit 14 comprise a decoding (DEC) stage of the pipeline; the instruction executing unit 15, the branch history information generating unit 16, the branch prediction information generating unit 17 and the branch instruction updating unit 18 comprise an executing (EX) stage of the pipeline; and the instruction executing unit 15 and the branch instruction updating unit 18 comprise a memory (MEM) access stage of the pipeline. Here, the process of each stage is performed in one-clock cycle independently and in parallel with the processes of the other stages.

The main memory 9 is achieved by a DRAM or the like, and stores a sequence of instructions (program) which is subject to the execution by the information processing apparatus 100. This program includes a branch instruction which is unique to the information processing apparatus 100.

Figure 3:
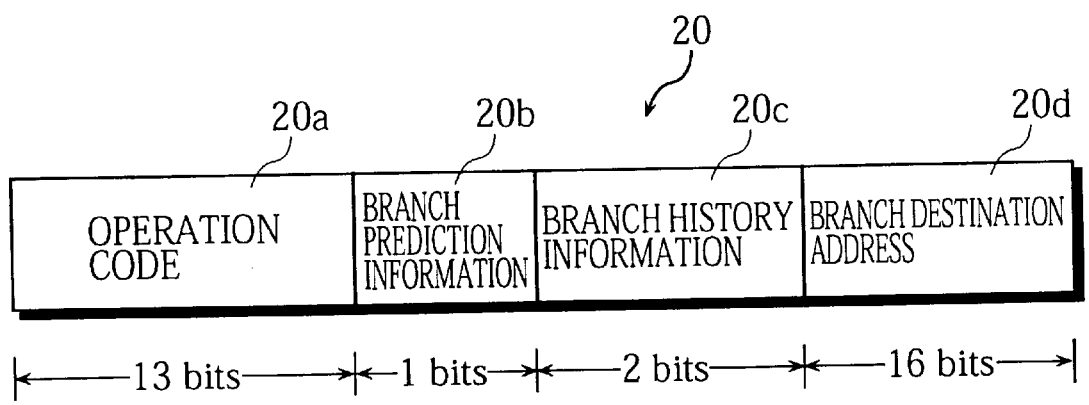
FIG. 3 shows a format of a branch instruction of the present invention.

FIG. 3 shows the branch instruction format of the information processing apparatus 100. A branch instruction 20 is composed of a 13-bit operation code 20a, 1-bit branch prediction information 20b, 2-bit branch history information 20c and a 16-bit branch destination address 20d. The operation code 20a shows an operation code and a branch condition which identify the present instruction.

The branch prediction information 20b predicts whether the branch is taken or not taken when the present branch instruction is next executed. The relation between the branch prediction information 20b and the prediction is as follows: when the branch prediction information 20b is "0", a branch is predicted "not taken"; and when the branch prediction information 20b is "1", a branch is predicted "taken".

The branch history information 20c is information which has been statistically compiled from a plurality of past results of this branch instruction. The relation between the branch history information 20c and the frequency with which the branch has been taken (here, the frequency is calculated by comparing with the case when the branch has not been taken) is as follows: when the branch history information 20c is "00", the frequency is "very low"; when the branch history information 20c is "01", the frequency is "low"; when the branch history information 20c is "10", the frequency is "high"; and when the branch history information 20c is "11", the frequency is "very high".

The branch destination address 20d shows the branch destination address for when the branch is taken, which is to say, the address in the main memory 9 of the next instruction to be executed. It should be noted here that when the branch is not taken, the next instruction to be executed is the one following this instruction.

The cache unit 11 is used for speeding up the access from the instruction fetching unit 12 to the main memory 9, and is composed of a cache memory 11a, a tag memory 11b and a cache controller 11c.

The cache memory 11a is achieved by an SRAM or the like, and is a high-speed memory which stores a part of the program stored in the main memory 9 in a unit called a cache block. The tag memory 11b stores a tag directory which is composed of an address of the cache block and other information.

The cache controller 11c detects a cache hit by comparing the address outputted by the instruction fetching unit 12 with the contents of the tag memory 11b. When a cache hit is detected, the access from the instruction fetching unit 12 to the cache memory 11a is validated. On the other hand, when a cache hit is not detected, the cache controller 11c replaces the cache block using an LRU (Least Recently Used) algorithm. When the cache block is replaced, the contents of the cache memory 11b and the main memory 9 are kept consistent by writing the cache block in the main memory 9 using the write back method.

The instruction fetching unit 12 prefetches an instruction which is to be decoded and executed. The instruction fetching unit 12 first outputs a fetch address transmitted from the instruction fetch counter 10a to the cache unit 11, fetches an instruction corresponding to the fetch address from the cache memory 11a (or the main memory 9) and then temporarily stores the instruction in an instruction buffer 12a, which is a register for storing one prefetched instruction.

The instruction register 13 is a register for storing one instruction which is subject to the decoding process. The instruction register 13 reads the instruction prefetched by the instruction buffer 12a in the next clock cycle, and stores the instruction while the instruction is being decoded. FIG. 2 shows the contents of a branch instruction stored in the instruction register 13.

The instruction decoding unit 14 is achieved by a ROM storing a microprogram or the like, and decodes the operation code 13a of an instruction stored in the instruction register 13 before outputting the decoding result as a control signal 141 to the instruction executing unit 15. When a branch instruction is subject to the decoding process, the instruction decoding unit 14 informs the instruction executing unit 15 and the address control unit 8 of the branch prediction information 13b of the branch instruction via a signal line 142.

The address control unit 8 controls the address generating unit 19 and the program counter group 10 in accordance with messages sent from the instruction decoding unit 14 and the instruction executing unit 15. By doing so, the address control unit 8 updates the values of three counters (an instruction fetch counter 10a, an instruction decoding counter 10b and an instruction executing counter 10c) included in the program counter group 10.

The instruction fetch counter 10a stores the address (fetch address) in the main memory 9 of the instruction that has been stored in the instruction buffer 12a, the instruction decoding counter 10b stores the address (decode address) in the main memory of the instruction that has been stored in the instruction register 13, and the instruction executing counter 10c stores the address (execution address) in the main memory of the instruction that is being executed by the instruction executing unit 15.

The address generating unit 19 includes an ALU and a selector. Under the control of the address control unit 8, the address generating unit 19 increments the contents of the counters 10a, 10b and 10c in the program counter group 10, and writes the branch destination address 13d into the instruction fetch counter 10a or invalidates the branch destination address 13d.

The instruction executing unit 15 performs computing and data transfer corresponding to each instruction, by controlling its internal components including a general register and a functional unit in accordance with the control signal 141 of the instruction decoding unit 14.

When the executed instruction is a branch instruction, the instruction executing unit 15 informs the branch history information generating unit 16 and the branch prediction information generating unit 17 of the execution result (whether the branch is taken or not taken) via a signal line 151. Also, the instruction executing unit 15 compares the execution result with the branch prediction information 13b, and then informs the instruction decoding unit 14 and the address control unit 8 of the comparison result (whether the prediction was correct or incorrect) via a signal line 152 for the penalty processing which is to be performed when the prediction was incorrect. Here, the penalty processing refers to the processes of invalidating the address transmitted to the instruction register 13, and of fetching the next instruction to be executed after the present branch instruction.

When a branch instruction has been executed by the instruction executing unit 15, the branch history information generating unit 16 judges whether the branch history information 13c in that instruction should be updated, in accordance with the present content of branch history information 13c and the execution result (whether the branch was taken or not taken). When judging that the branch history information needs to be updated, the branch history information generating unit 16 generates new branch history information, and outputs its judging result (whether the branch history information is to be "maintained" or "updated") and the new branch history information to the branch instruction updating unit 18.

When a branch instruction is executed by the instruction executing unit 15, the branch prediction information generating unit 17 judges whether the branch prediction information in a branch instruction should be updated in accordance with the branch history information 13c included in the branch instruction and the execution result (whether the branch was taken or not taken). When judging that the branch prediction information is to be updated, the branch prediction information generating unit 17 generates new branch prediction information, and then outputs the result (whether the branch prediction information is to be "maintained" or "updated") and the new branch prediction information to the branch instruction updating unit 18.

FIG. 4 is a truth table showing the input-output relations of the branch history information generating unit 16 and the branch prediction information generating unit 17. The input value column shows all combinations of the branch history information H1H0 and the execution result X which are inputted into the branch history information generating unit 16 and the branch prediction information generating unit 17. The branch history information N1N0 column of the output value column shows the new branch history information which is outputted by the branch history information generating unit 16 in accordance with the combinations of the input values in the input value column. The branch prediction information F column of the output value column shows the new branch prediction information which is outputted by the branch prediction information generating unit 17 in accordance with the combinations of the input values in the input value column. It should be noted here that some values in the outputted value column are given as "–", showing that the values have no meaning. When this is the case, it means the branch history information generating unit 16 (or the branch prediction information generating unit 17) informs the branch instruction updating unit 18 via another signal line that the branch history information (or the branch prediction information) is to be "maintained".

Figure 5:
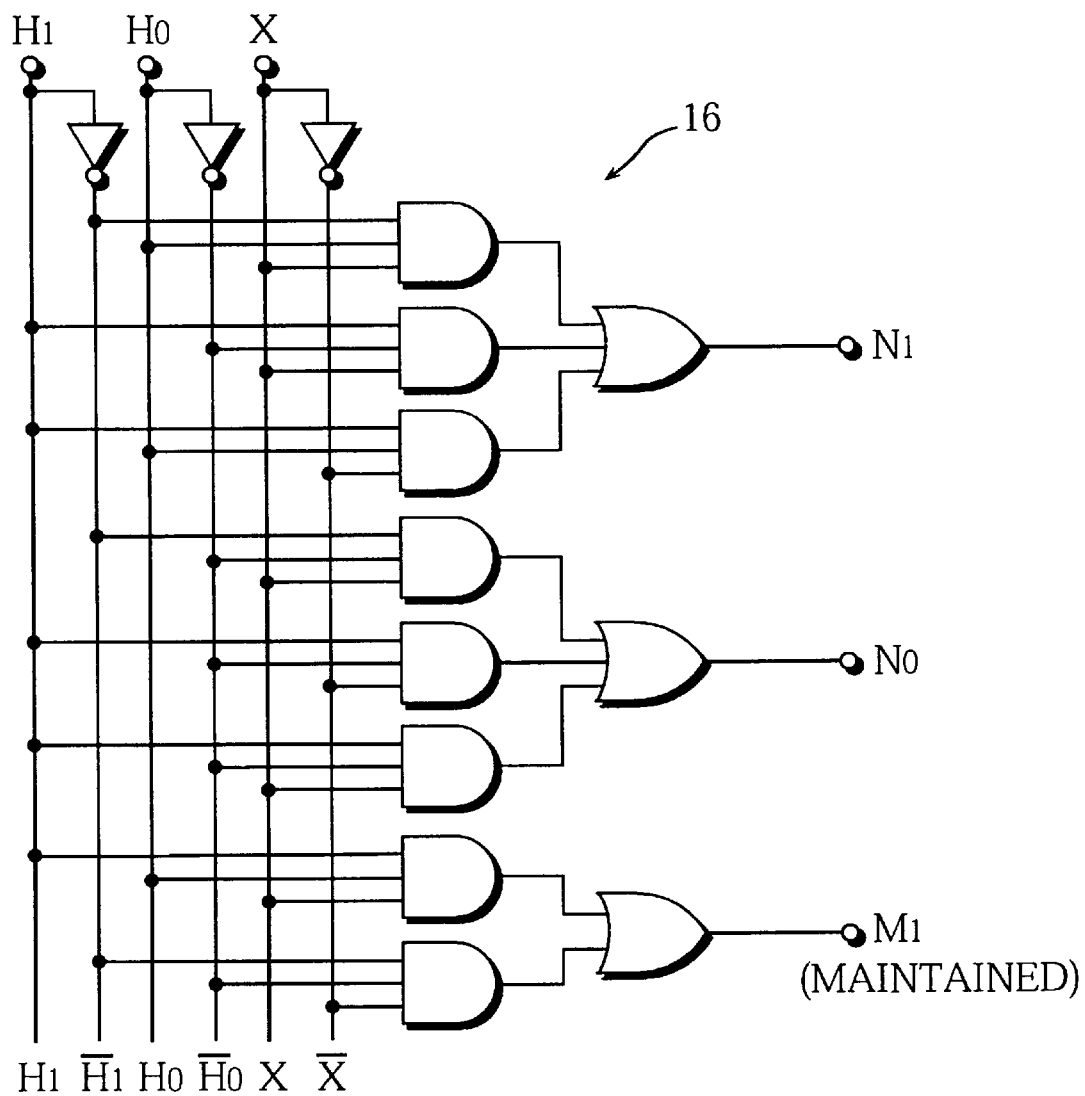
FIG. 5 is shows the detailed circuit of the branch history information generating unit 16.

FIG. 5 shows the detailed circuit of the branch history information generating unit 16. The circuit in the branch history information generating unit 16 is implemented as a combinational logic circuit that outputs a 3-bit signal (the branch history information N1N0, and the information M1 indicating that the present branch history information should be "maintained") to the branch instruction updating unit 18, corresponding to a 3-bit input signal (the branch history information H1H0 and the execution result X).

Figure 6:
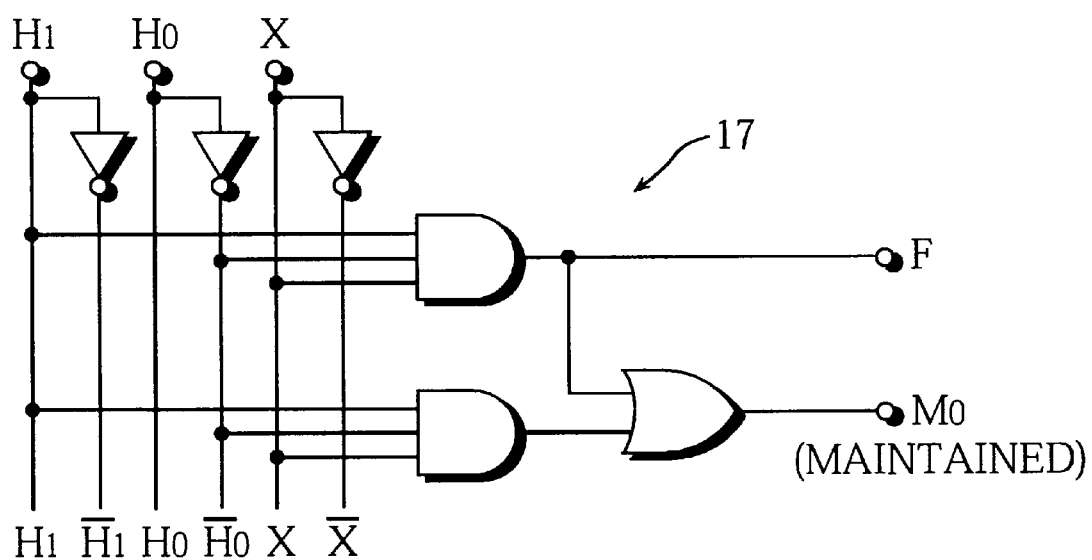
FIG. 6 is the detailed circuit of the branch prediction information generating unit 17.

FIG. 6 shows the detailed circuit of the branch prediction information generating unit 17. The circuit in the branch prediction information generating unit 17 is implemented as a combinational logic circuit that outputs a 2-bit signal (the branch prediction information F and the information M0 indicating that the present branch prediction information should be "maintained") to the branch instruction updating unit 18, corresponding to a 3-bit input signal (the branch history information H1H0 and the execution result X). It should be noted here that when the branch history information N1N0 and the branch prediction information F is to be "maintained", the logical values of the information M1 and M0 are set to "1".

Figure 7:
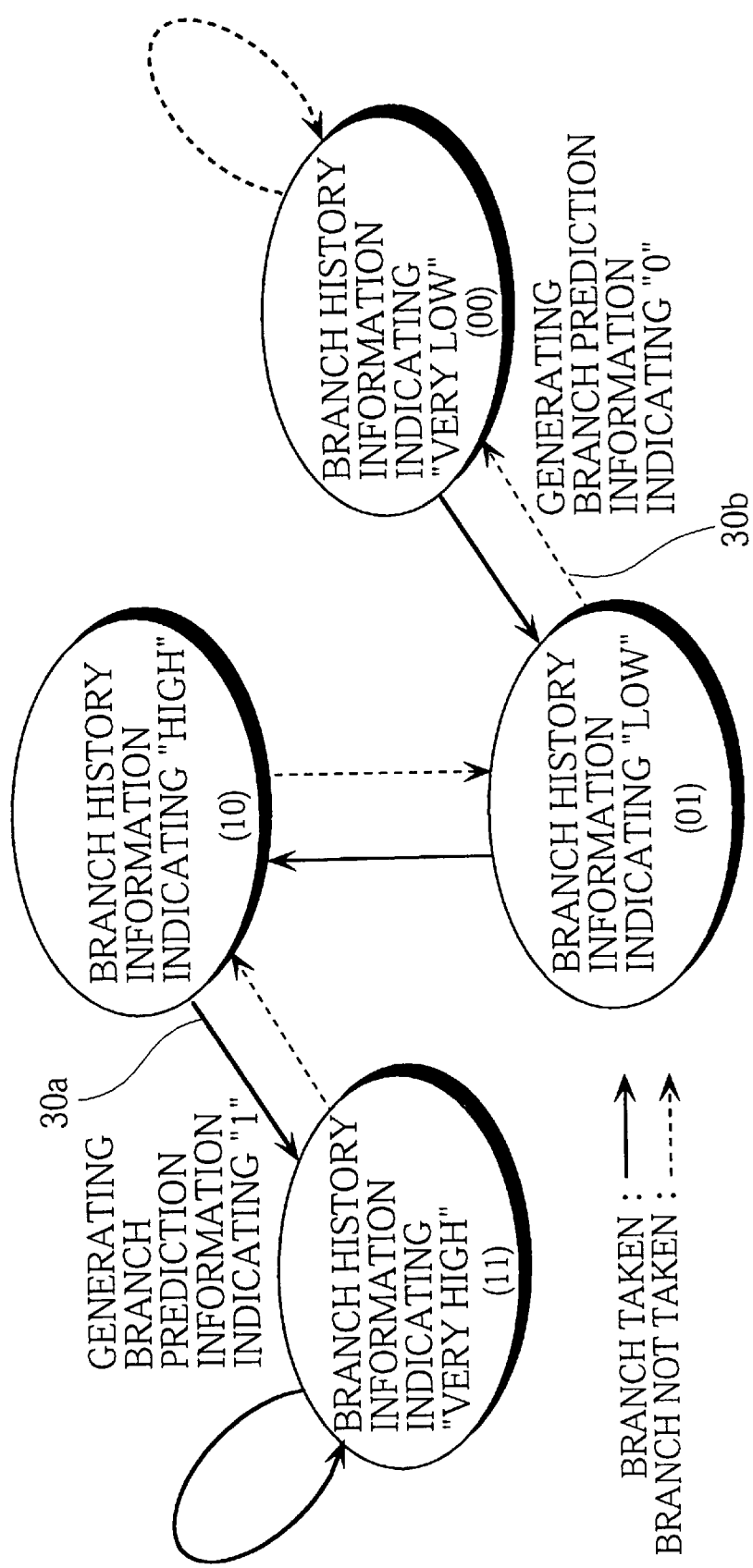
FIG. 7 is a state transition diagram showing a updated algorithm of the branch history information and the branch prediction information of the branch instruction.

FIG. 7 is a state transition diagram of a branch instruction 20 with the state being the value of the branch history information 20c, and also shows an updating algorithm of the branch history information and the branch prediction information shown in FIG. 4.

As shown in FIG. 7, each of the four oval figures shows the value (state) which the 2-bit branch history information may take. The transition arrows drawn as solid lines indicate the transition direction when the execution result is "1", which is to say when a branch has been taken. Meanwhile, the transition arrows drawn as broken lines indicate the transition direction when the execution result is "0", which is to say when a branch has not been taken. The processes performed when the branch prediction information is outputted (updated) explicitly are described beside the transition arrows 30a and 30b.

For example, when the branch history information is "10" before the execution (which is to say, the frequency with which the present branch has been taken before is "high"), and the execution result of the branch instruction is "1", namely "taken", the branch history information generating unit 16 outputs the new branch history information "11" (indicating the frequency with which the present branch has previously been taken is "very high") to the branch instruction updating unit 18. Simultaneously, the branch prediction information generating unit 17 outputs the new branch prediction information as "1" (which means "taken") to the branch instruction updating unit 18.

The branch instruction updating unit 18 updates the first 16 bits of the branch instruction (the operation code 20a, the branch prediction information 20b, and the branch history information 20c) which are stored in the cache memory 11a (or main memory 9) whose address is indicated by the value of the instruction executing counter 10c, in accordance with the signals (N1, N0, and M1) from the branch history information generating unit 16, the signals (F and M0) from the branch prediction information generating unit 17, and the value of the instruction executing counter 10c. However, when receiving the notification that the information should be "maintained" from both of the branch history information generating unit 16 and the branch prediction information generating unit 17, or when receiving the notification that the instruction executed by the instruction executing unit 15 is not a branch instruction, the branch instruction updating unit 18 will perform no action on the main memory 9 (or the cache memory 11a).

Figure 8:
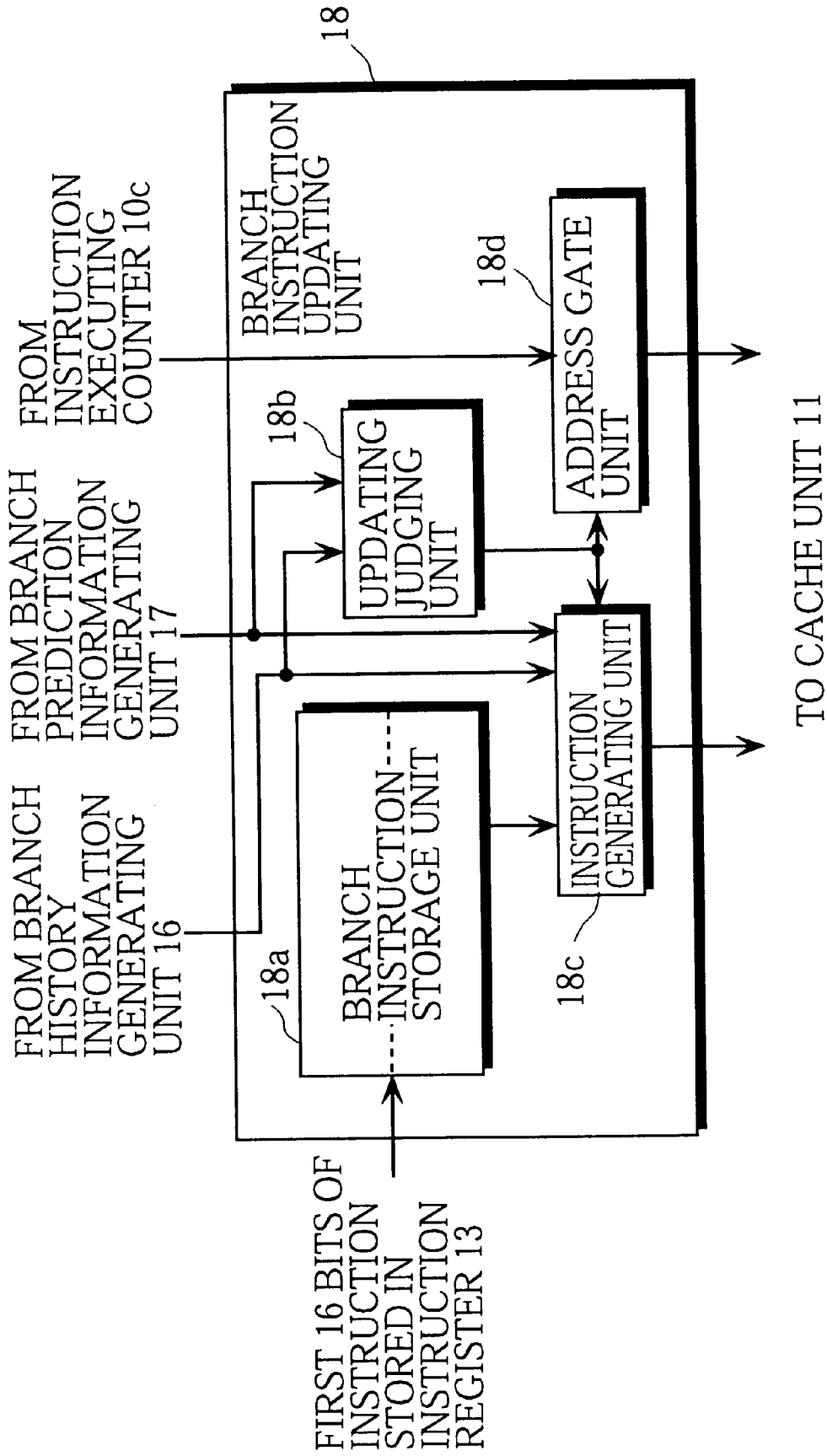
FIG. 8 is a block diagram showing the detailed structure of the branch instruction updating unit 18 of the information processing apparatus.

FIG. 8 is a block diagram showing the detailed structure of the branch instruction updating unit 18. The branch instruction updating unit 18 is composed of a branch instruction storage unit 18a, an updating judging unit 18b, an instruction generating unit 18c, and an address gate unit 18d.

The branch instruction storage unit 18a is a queue buffer which, every time a new instruction is stored in the instruction register 13, obtains and stores the first 16 bits of the new instruction (when the new instruction is a branch instruction, the 16 bits represent the branch prediction information 13b and the branch history information 13c), and also stores the 16 bits of each of the two instructions in the decoding stage and the executing stage.

The updating judging unit 18b obtains the signal M1 indicating whether the branch history information is updated from the branch history information generating unit 16, and the signal M0 indicating whether the branch prediction information is updated from the branch prediction information generating unit 17. In accordance with these signals, the updating judging unit 18b controls the generation of a new branch instruction by the instruction generating unit 18c and the allowance of the output of an address by the address gate unit 18d.

The instruction generating unit 18c overwrites the new branch history information N1N0 and the new branch prediction information F outputted by the branch history information generating unit 16 and the branch prediction information generating unit 17 on the first of the two 16-bit instructions to be stored in the branch instruction storage unit 18a (which is equivalent to the first 16 bits of the branch instruction that has just been executed). By doing so, the instruction generating unit 18c generates the first 16 bits of the branch instruction in the cache unit 11 (or the main memory 9) which is to be updated. It should be noted here that when receiving the signals (M1 and M0) to "maintain" the present information from the updating judging unit 18b, the instruction generating unit 18c will not update the branch history information and the branch prediction information corresponding to the signals.

Accordingly, when at least one of the branch prediction information 20b and the branch history information 20c of the branch instruction executed by the instruction executing unit 15 should be updated, the branch instruction updating unit 18 updates the branch instruction 20 by overwriting the new 16 bits on the first 16 bits of the branch instruction stored in the cache memory 11a (or the main memory 9).

The following is a description of specific changes of the branch history information and the branch prediction information made by the branch history information generating unit 16, the branch prediction information generating unit 17 and the branch instruction updating unit 18, with reference to the state transition diagram of FIG. 7.

Suppose that the branch instruction 20, whose branch history information 20c is "00" and whose branch prediction information 20b is "0", is executed repeatedly. In this case, the specific changes of the branch history information and the branch prediction information are as follows:

when the branch is taken at the first execution, the branch history information 20c is updated to "01" and the branch prediction information 20b is left unchanged;

when the branch is taken at the second execution, the branch history information 20c is updated to "10" and the branch prediction information 20b is left unchanged;

when the branch is taken at the third execution, the branch history information 20c is updated to "11" and the branch prediction information 20b is updated to "1";

when the branch is not taken at the fourth execution, the branch history information 20c is updated to "10" and the branch prediction information 20b is left unchanged;

when the branch is not taken at the fifth execution, the branch history information 20c is updated to "01" and the branch prediction information 20b is left unchanged; and when the branch is not taken at the sixth execution, the branch history information 20c is updated to "00" and the branch prediction information 20b is updated to "0".

Figure 9:
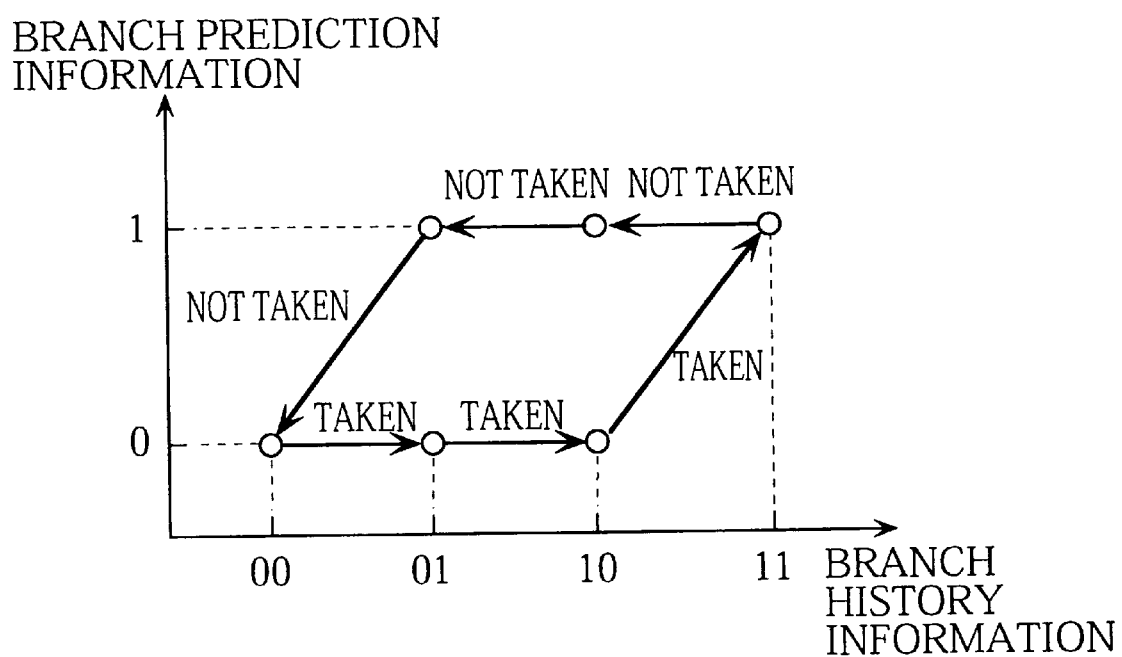
FIG. 9 is a graph showing relations among the branch prediction information and the branch history information of the branch instruction and the branch result.

FIG. 9 is a graph showing the above examples, where the vertical axis shows the value of the branch prediction information 20b, the horizontal axis shows the value of the branch history information 20c, and the coordinates are plotted.

As shown in FIG. 9, the transition point of the branch history information 20c when the branch is successively taken and the branch prediction information 20b is changed from "0" to "1" is different from that of the branch history information 20c when the branch is successively not taken and the branch prediction information 20b is changed from "1" to "0". That is to say, the inversion thresholds of the branch prediction information 20b are different, depending on the direction in which the branch history information 20c changes. It can be said that a map which determines the branch prediction information 20b using the history of execution results as an input exhibits hysteresis. In other words, as long as there is no noticeable difference between the frequencies with which the branch has been taken and has not been taken, the present branch prediction is maintained.

Using this hysteresis, malfunctions, such as a disorder in the branch prediction information 20b caused by an exceptional branch and or the complete inaccuracy in the branch prediction when a branch is alternately taken and not taken, are avoided. Moreover, the accuracy of the branch prediction in control-type programs is especially improved.

Operation of Information Processing Apparatus 100

The following is a description of the operation performed by the information processing apparatus 100 which has the stated structure, with reference to an example of the case where a specific branch is executed.

Figure 10:
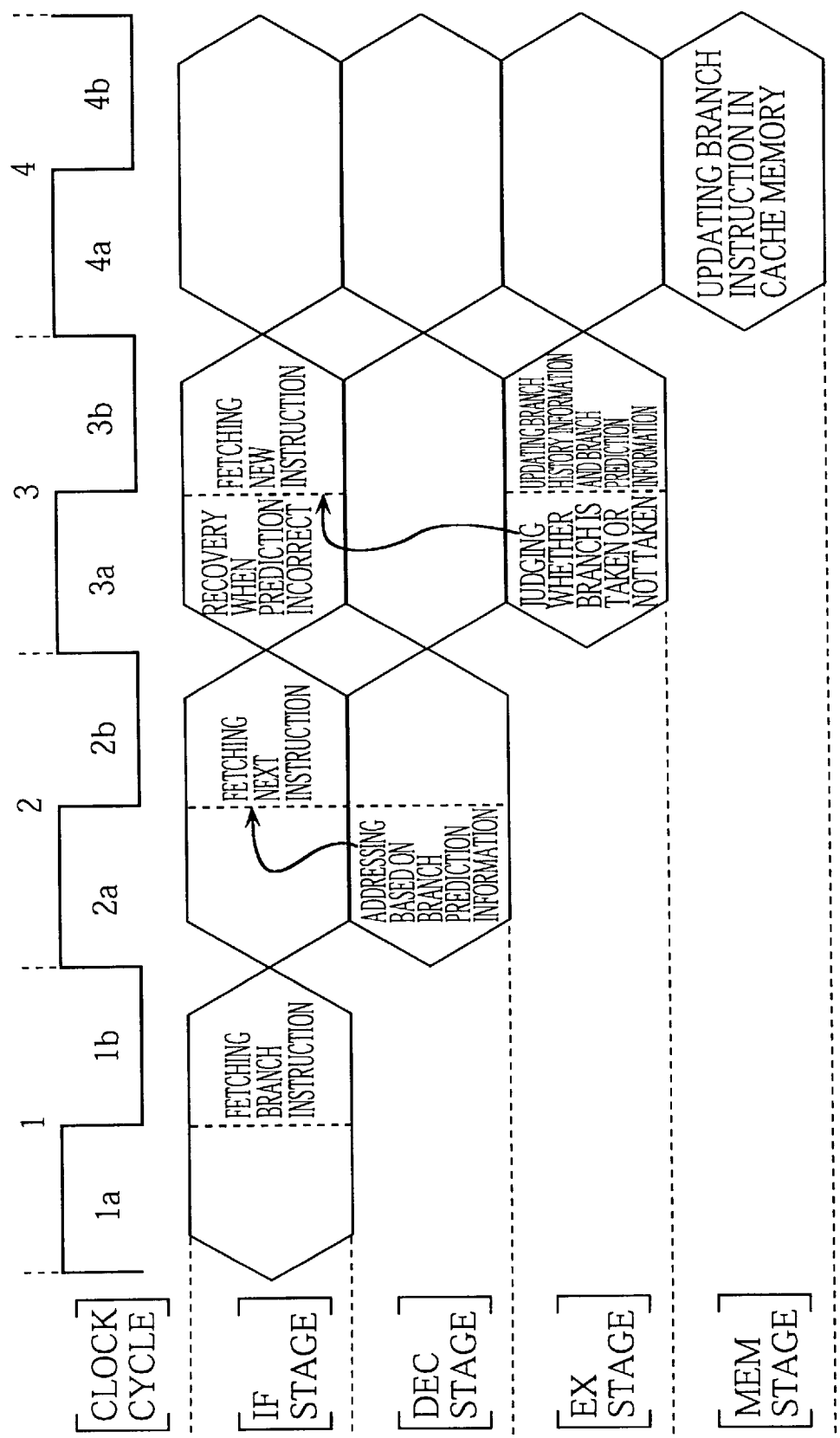
FIG. 10 shows a flow of the pipeline process performed by the information processing apparatus.

FIG. 10 shows a flow of the pipeline process performed by the information processing apparatus 100. Here, the initial values of the branch prediction information 20b and the branch history information 20c of the branch instruction 20 stored in the main memory 9 are respectively "0" and "01". It should be noted here that these initial values are generated by a compiler through a static analysis on a source program. Also, a cache block including the branch instruction is read from the main memory 9 and is stored in the cache memory 11a.

(1) Instruction Fetching (IF) Stage

The branch instruction is read out from the cache memory 11a and is stored in the instruction buffer 12a by the instruction fetching unit 12 during the second half of the clock cycle 1 (1b).

(2) Decoding (DEC) Stage

The branch instruction pre-read by the instruction buffer 12a is transferred to the instruction register 13 and is decoded by the instruction decoding unit 14 during the first half of the clock cycle 2 (2a).

More specifically, the instruction decoding unit 14 judges whether the instruction to be decoded is a branch instruction by decoding the operation code 13a stored in the instruction register 13. Also, in addition to outputting the control signal for the judgement of the branch condition to the instruction executing unit 15, the instruction decoding unit 14 informs the address control unit 8 of the branch prediction information 13b stored in the instruction register 13.

The address control unit 8 predicts that the execution of the instruction will not result in a branch because the branch prediction information 13b is "0", and then increments the value of the instruction fetch counter 10a by controlling the address generating unit 19. The value (the fetch address) is then outputted to the cache unit 11 through the instruction fetching unit 12.

As a result, in the IF stage during the second half of the clock cycle 2 (2b), the next instruction following the present branch instruction is read out by the instruction fetching unit 12 and is stored in the instruction buffer 12a. Accordingly, the next instruction is pre-read in accordance with the branch prediction information included in the branch instruction even before the branch instruction is executed.

(3) Executing (EX) Stage

During the first half of the clock cycle 3 (3a), the instruction executing unit 15 judges the condition of the branch instruction in accordance with the control signal from the instruction decoding unit 14. After this, the instruction executing unit 15 informs the branch history information generating unit 16 and the branch prediction information generating unit 17 of the execution result (whether the branch was taken or not taken), as well as informing the instruction decoding unit 14 and the address control unit 8 of the prediction result (whether the prediction was correct or incorrect).

On receiving the notification of the execution result during the second half of the clock cycle 3 (3b), the branch history information generating unit 16 and the branch prediction information generating unit 17 obtain the branch history information 13c stored in the instruction register 13, generate new branch history information and new branch prediction information or maintain the present information, and then inform the branch instruction updating unit 18 of the result. Having received the notification of the new branch history information and/or the new branch prediction information, the branch instruction updating unit 18 generates the first 16 bits of the new branch instruction including these sets of information.

It should be noted here that when the prediction is incorrect, the penalty processing (invalidation of the instruction transferred by the instruction register 13 and fetching the next instruction to be executed based on the execution result) is performed by the instruction executing unit 15 and the instruction fetching unit 12.

(4) Memory (MEM) Stage

During the clock cycle 4, when having received the notification that at least one of the branch prediction information 20b and the branch history information 20c is "updated" from the branch history information generating unit 16 and the branch prediction information generating unit 17, the branch instruction updating unit 18 overwrites the first 16 bits of the branch instruction generated during the clock cycle 3b on the branch instruction stored in the cache memory 11a indicated by the execution address stored in the instruction executing counter 10c.

The cache block including the updated branch instruction in the cache memory 11a is written in the corresponding position in the main memory 9 by the cache controller 11c before being erased from the cache memory 11a. Due to the operation in this MEM stage, when the branch instruction is read from the main memory 9 and is executed again, the branch prediction information 20b and the branch history information 20c included in the branch instruction will definitely be valid information based on the past branch results.

Accordingly, in the information processing apparatus 100, the branch history information and the branch prediction information of each branch instruction is held, not in a dedicated storage table, but in the branch instruction itself. Therefore, the hardware size required for the information processing apparatus 100 is suppressed, as compared with the case where the branch history information and the branch prediction information of a plurality of branch instructions are stored permanently in the internal memory of the information processing apparatus 100.

The branch instruction performed by the information processing apparatus 100 includes the 1-bit branch prediction information as well as the 2-bit branch history information showing the summary of a plurality of branch results. As such, the branch prediction, which possesses a hysteresis in accordance with the branch history information and the preceding execution result, is made. Consequently, the hit rate of the branch prediction is raised, as compared with prediction based on the branch prediction information with only 1 bit, and reliable branch prediction which is resistant to the effects of an exceptional branch is achieved.

Although the main memory 9 is a DRAM or the like, and the cache memory 11a is an SRAM or the like in the present embodiment, it should be obvious that the present invention is not limited to these components.

As an example, the main memory 9 may be non-volatile storage apparatus such as a hard disc. Consequently, even if the power of the information processing apparatus is turned off, the branch prediction information 20b and the branch history information 20c is still stored on such hard disc, so that the valid branch prediction can be performed without having to first accumulate the branch history information.

Modification 1

The following is a description of a modification of the information processing apparatus 100 in the stated embodiment.

As shown in FIG. 7 in the embodiment described above, the branch prediction information is set as "taken" only when the branch history information moves from "high" to "very high", and is set as "not taken" only when the branch history information moves from "low" to "very low".

Figure 11:
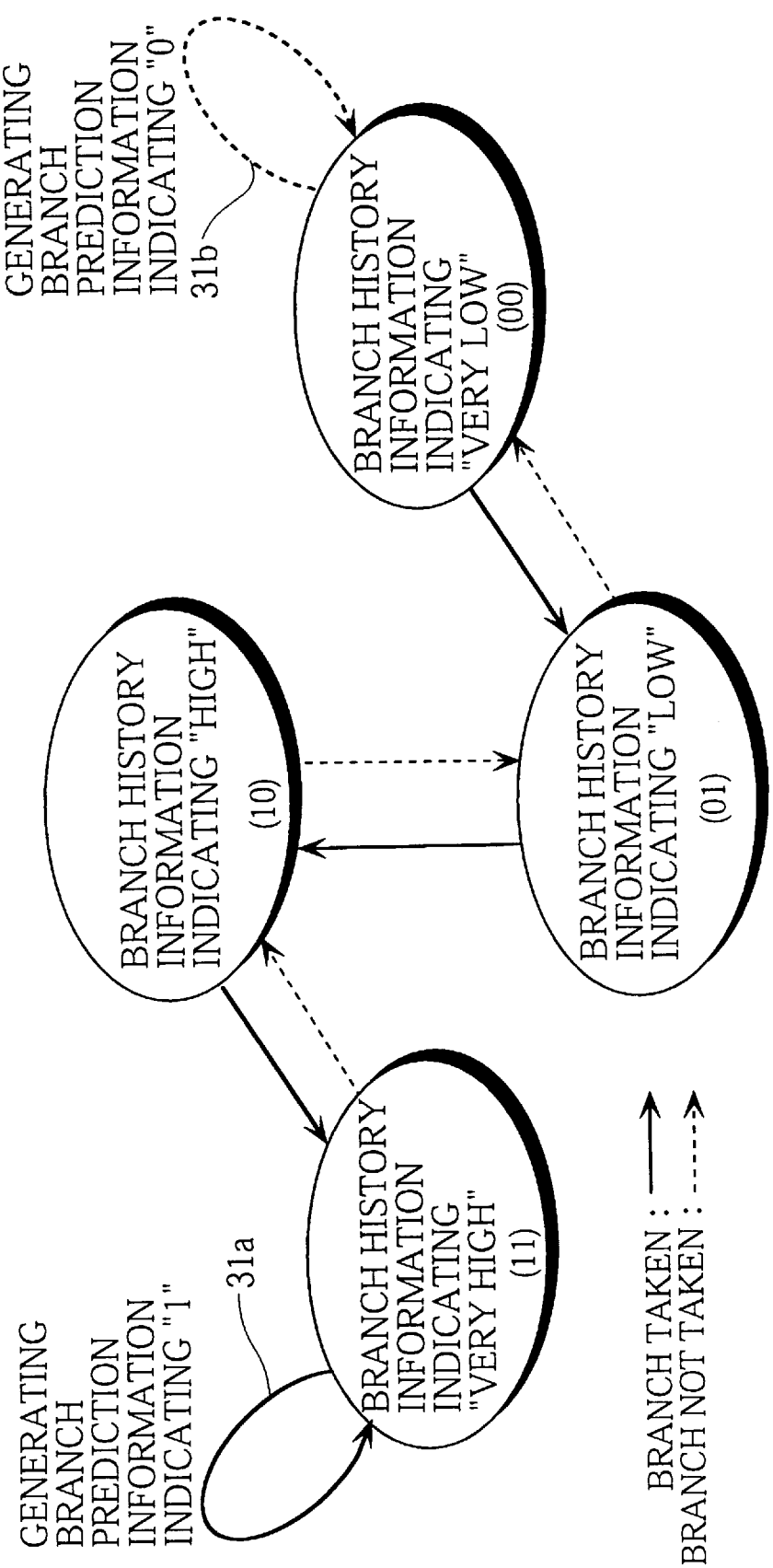
FIG. 11 shows a state transition diagram showing a updated algorithm of the branch history information and the branch prediction information of the branch instruction, to which an information processing apparatus of the modification 1 relates.

In this modification, however, the updating algorithm is changed, as written beside the transition arrows 31a and 31b of the state transition diagram in FIG. 11, so that the branch prediction information is set as "taken" only when the branch history information stays "very high" (that is, the execution result of the branch instruction, with the branch history information being "very high", is "taken") and is set as "not taken" only when the branch history information stays "very low" (that is, the execution result of the branch instruction, with the branch history information being "very low", is "not taken"), with the setting not being changed in all other cases. This can be easily realized by modifying the wiring pattern of the combinational logic circuit included in the branch prediction information generating unit 17.

This modification 1 shows a case where the level of the hysteresis is higher than that in the stated embodiment, which can be understood by comparing FIG. 7 with FIG. 11. In other words, the branch prediction information in FIG. 11 will not change due to irregular branch results.

Accordingly, it is possible to realize an information processing apparatus which is suitable for systems where suppression of disorders in the branch prediction information flow is a high priority or systems where changes in the branch prediction information are not desired, such as a system where an initial value determined by static information is maintained whenever possible in spite of dynamic events at the time of execution.

Modification 2

Although the branch history information is composed of 2 bits in the stated embodiment, it may be easily modified to 1 bit.

Figure 12:
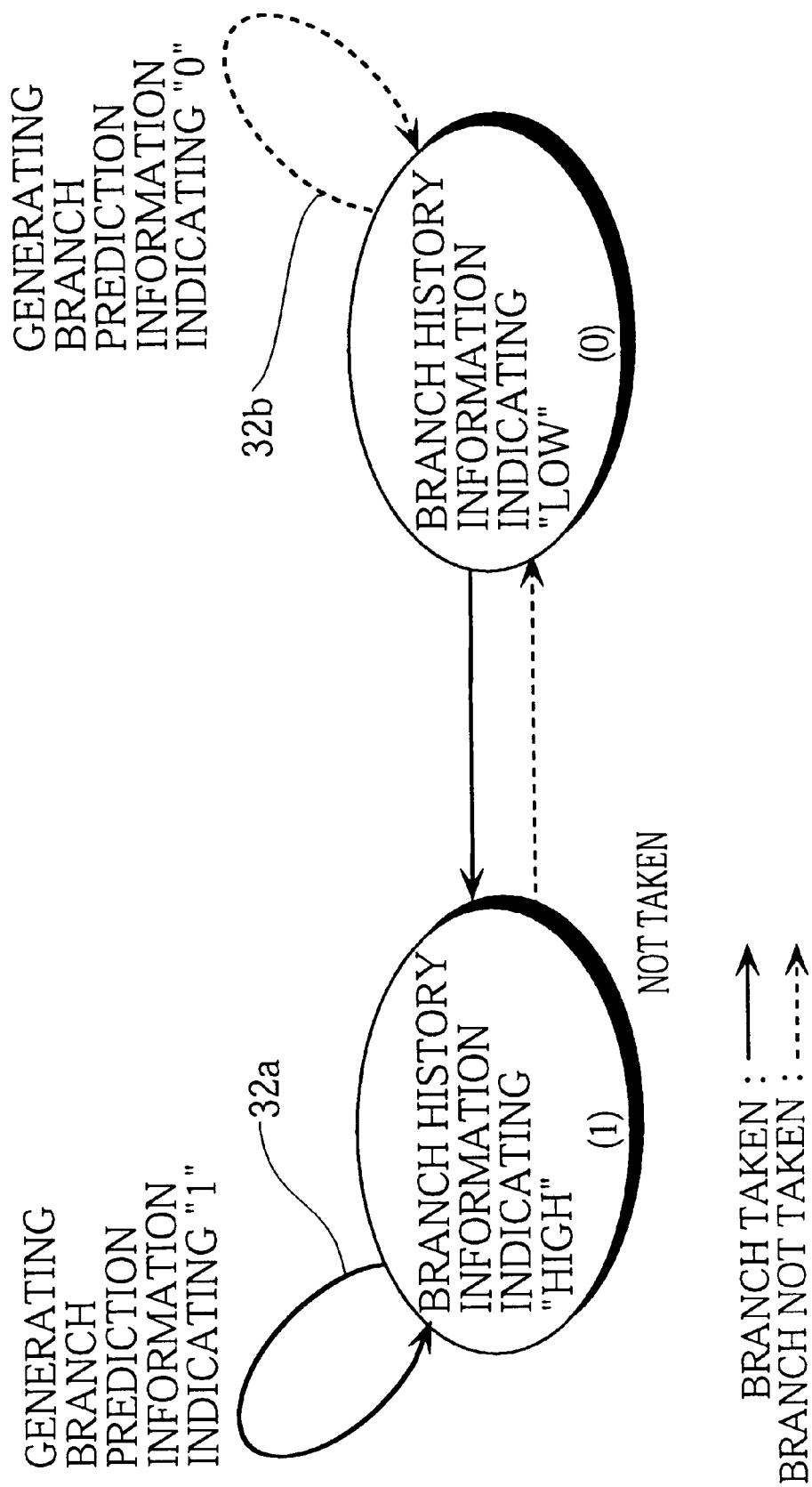
FIG. 12 shows a state transition diagram showing a updated algorithm of the branch history information and the branch prediction information of the branch instruction, to which an information processing apparatus of the modification 2 relates.

FIG. 12 shows a state transition diagram showing a updating algorithm of the branch history information in the case where the branch history information is composed of 1 bit. The branch history information belongs to either of the state "high" and the state "low", with the states respectively indicating that the preceding execution result was "taken" and "not taken". As written beside the transition arrow 32a, the branch prediction information is set as "taken" only when the branch history information stays "high" (that is, the execution result of the branch instruction, with the branch history information being "high", is "taken"). Similarly, as written beside the transition arrow 32b, the branch prediction information is set as "not taken" only when the branch history information stays "low" (that is, the execution result of the branch instruction, with the branch history information being "low", is "not taken"). Here, the setting is not changed for other transitions. Accordingly, the setting of the branch prediction information is not changed while the execution results of the branch instruction repeatedly alternates between "taken" and "not taken", but when a same result is repeated, the branch prediction information is set as the value corresponding to the result.

As can readily understood, the modification 2 can be easily realized by reducing the logic circuits and by modifying the wiring patterns of the logic circuits of the branch history information generating unit 16 and the branch prediction information generating unit 17 of the stated embodiment.

This modification 2 can be understood by comparing FIG. 7 with FIG. 12, which show that the level of the hysteresis in this second modification is lower than in FIG. 7 of the stated embodiment. In other words, the branch prediction information is sensitive to the change of the branch history information, as compared with the branch prediction information in the stated embodiment. Accordingly, an information processing apparatus suitable for a system which is more sensitive to the program execution results than the information processing apparatus 100 of the stated embodiment, that is, a real time system with a rash of exceptional processes, can be realized.

The branch history information is composed with only 1 bit in the modification 2, so that the code size is reduced and the instruction set can be defined (mapping of an operation code) more freely.

Modification 3

In the stated embodiment and the modifications 1 and 2, the information processing apparatus performs the branch instructions including branch history information which is a statistic summary of the past branch results. It may be easily modified to an information processing apparatus which performs branch instructions which respectively include the branch history information composed of a plurality of bits corresponding to each past branch.

That is to say, an information processing apparatus which performs a branch instruction including a plurality of bits showing a plurality of past execution results of the branch instruction is realized by modifying the functions (input-output conversion algorithm) of the branch history information generating unit 16 and the branch prediction information generating unit 17 of the information processing apparatus 100 in the stated embodiment.

FIG. 13, which corresponds to FIG. 4 of the stated embodiment, is a truth table showing an updating algorithm performed by a branch history information generating unit and a branch prediction information generating unit of an information apparatus to which the modification 3 relates.

In contrast to the stated embodiment, the 2-bit branch history information 20c included in a branch instruction shows the branch result of the preceding execution using the latter bit H0 ("1" indicates "taken" and "0" indicates "not taken"), and shows the branch result two executions previously using the first bit H1.

The branch history information generating unit of the modification 3 is a queue buffer and, on receiving the notification of a new execution result X from the instruction executing unit 15, generates new branch history information N1N0 by inputting the execution result X in the latter bit N0, shifting the stored 2-bit H1H0 upward.

As a general rule, the branch prediction information generating unit of the modification 3 uses the more numerous logical value in 3 bits as the new branch prediction information F, with the 3 bits being the 2-bit branch history information H1H0 before the execution of the branch instruction and the 1-bit execution result X notified by the instruction executing unit 15 (for example, when H1H0=01 and X=1, the more numerous logical value is "1"). In the only exceptional case where these 3 bits, H1H0 and X, are alternating 0 and 1, the branch prediction information generating unit generates a logical value as the new branch prediction information F following the alternation (for example, when H1H0X=010, the generated logical value is "1", and when H1H0X=101, the generated logical value is "0"). In general, a next branch prediction is generated as the more numerous of the past three execution results ("taken" or "not taken"). However, in the exceptional case where the past three execution results alternate "taken" and "not taken", the branch prediction is made following the alternation.

Figure 14:
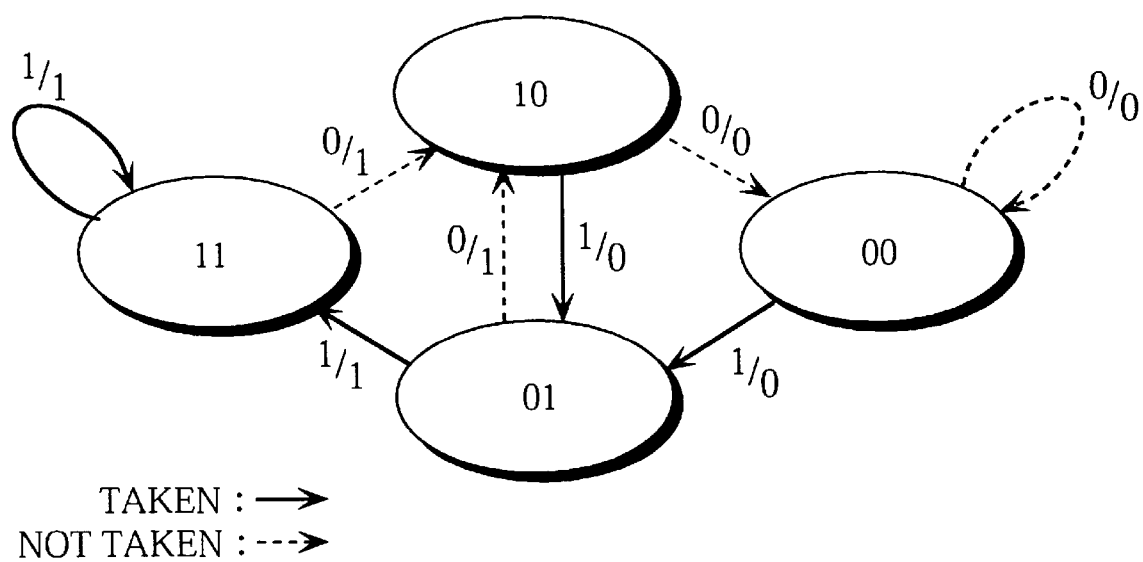
FIG. 14 shows a state transition diagram showing a updated algorithm of the branch history information and the branch prediction information of the branch instruction, to which the modification 3 relates.

FIG. 14 is a state transition diagram showing the updated algorithm of the branch history information and the branch prediction information of the modification 3, and corresponds to FIG. 7 in the stated embodiment. As shown in FIG. 14, the values given beside the transition arrows show the sources of the transitions (that is, the values of the execution result Xs) and the values of the new branch prediction information outputted by the branch prediction information generating unit in accordance with the transitions.

Here, as one example, when the branch instruction 20, with the branch history information 20c "00" and the branch prediction information 20b "0", is executed repeatedly, the values of the branch history information 20c and the branch prediction information 20b are updated or left unchanged as follows:

when the first execution result of the branch is "taken" (not predicted), the branch history information 20c is updated to "01" and the branch prediction information 20b is set as "0" (unchanged);

when the second execution result of the branch is "not taken" (as predicted), the branch history information 20c is updated to "10" and the branch prediction information 20b is changed to "1";

when the third execution result of the branch is "taken" (as predicted), the branch history information 20c is updated to "01" and the branch prediction information 20b is changed to "0"; and when the fourth execution result of the branch is "not taken" (as predicted), the branch history information 20c is updated to "10" and the branch prediction information 20b is changed to "1".

By means of the information processing apparatus of the modification 3, as distinct from the information processing apparatus of the stated embodiment, the branch prediction is made in accordance with the past branch results in general, and is also made on the assumption that a "toggle" situation will continue when the branches are alternately "taken" and "not taken". As a result, branches can be accurately predicted even for this special kind of program flow.

Up to this point, the information processing apparatus of the present invention has been described in one embodiment and three modifications, although the present invention is not limited to these.

It should be obvious that other modifications can be easily realized by combining the values, such as the conditions for determining the branch prediction information (combination of the value of branch history information and the branch result), the algorithm updating the branch history information, and the number of bits of the branch history information.

As one example, the branch history information may be assigned 3 bits showing a more detailed summary of the branch history in 8 phases. By doing so, a more detailed branch prediction with a higher accuracy can be made.

It should be noted here, however, that when the number of bits in a branch instruction assigned for making a branch prediction is increased, there is a trade-off with the freedom with which the instruction set can be defined, so that the number of used bits should be determined with regard to the required prediction accuracy and required instruction types.

The constituents of the stated embodiment and modifications are explained on the precondition that they are all realized by the logical circuits, although it goes without saying that the present invention can be realized not only by hardware, but also by software.

More specifically, the constituents of the information processing apparatus 100 of the stated embodiment such as storage means 9, 11a, 11b, 12a, 13, 10a, 10b and 10c for storing instructions and values may be assigned to variables and data area, and the remaining functions of such as control means 8, 11c, 12, and 14–19 may be described using a programming language. Accordingly, the information processing apparatus of the present invention can be realized as a simulation program and a virtual machine executed by a general computer system. A program for realizing such an information processing apparatus of the present invention may be stored on a storage medium such as a CD-ROM and may be distributed.

Figure 1:
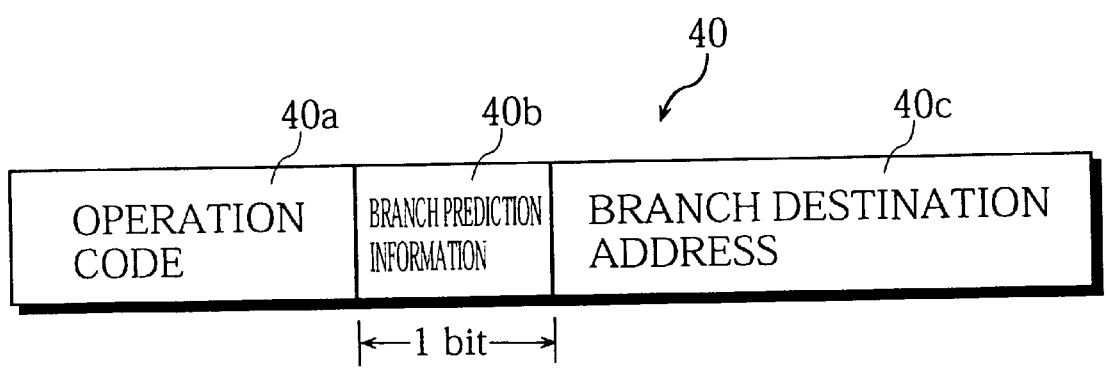
FIG. 1 shows a format of a conventional branch instruction.

Furthermore, the branch instruction of the stated embodiment and modifications includes the branch history information which is unique to the present invention as shown in the instruction format of FIG. 3 for example, unlike the conventional instruction format shown in FIG. 1. The branch instruction including the characteristic structure is unique to the present invention. It should be obvious that a set of instructions (a program) including such a branch instruction, as is the case with the program, can be distributed via a storage medium, such as a floppy disk, or a communication line.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. An information processing apparatus which sequentially executes instructions, the information processing apparatus comprising:

storage means for storing a instruction group including a branch instruction which possesses a set of branch prediction information for a prediction as to whether a branch is taken or not taken, and a set of branch history information showing a plurality of past branch results;

instruction fetching means for fetching an instruction to be executed from the storage means;

instruction decoding means for decoding the instruction fetched by the instruction fetching means and judging whether the instruction is the branch instruction;

instruction fetch controlling means for controlling, when the fetched instruction is judged to be the branch instruction, the instruction fetching means to fetch an instruction in accordance with the set of branch prediction information of the branch instruction;

executing means for executing the decoded branch instruction;

branch prediction information generating means for generating a new set of branch prediction information in accordance with a branch result when the branch instruction is executed and the set of branch history information included in the branch instruction;

branch history information generating means for generating a new set of branch history information in accordance with a branch result when the branch instruction is executed and the set of branch history information included in the branch instruction; and branch instruction updating means for updating the set of branch prediction information and the set of branch history information of the branch instruction stored in the storage means respectively to the new set of branch prediction information generated by the branch prediction information generating means and the new set of branch history information generated by the branch history information generating means.

2. The information processing apparatus of claim 1, wherein the set of branch history information is a summary of a plurality of past branch results of the branch instruction which possesses the set of branch history information.

3. The information processing apparatus of claim 2, wherein the set of branch history information shows that a frequency, with which the branch corresponding to the branch instruction has been taken, is "very high", "high", "low" or "very low".

4. The information processing apparatus of claim 3, wherein the branch history information generating means, when the set of branch history information included in the branch instruction is "very ", "low" or "high", and the branch result was "taken", generates a new set of branch history information indicating "low", "high" or "very high" respectively corresponding to the set of branch history information, and when the set of branch history information included in the branch instruction indicates "very high", "high" or "low", and the branch result was "not taken", generates a new set of branch history information indicating "high", "low" or "very low" respectively corresponding to the set of branch history information.

5. The information processing apparatus of claim 4, wherein the branch prediction information updating means generates a new set of branch prediction information indicating "taken" only when the branch history information indicates "high" and the branch result was "taken", and generates a new set of branch prediction information indicating "not taken" only when the branch history information indicates "low" and the branch result was "not taken".

6. The information processing apparatus of claim 5, wherein the branch instruction updating means generates a new branch instruction which includes a set of branch prediction information generated by the branch prediction information generating means and a set of branch history information generated by the branch history information generating means, and then overwrites the new branch instruction at a corresponding location in the storage means, wherein the corresponding location stores a source branch instruction of the new branch instruction.

7. The information processing apparatus of claim 6, wherein the storage means includes:
   a main storage unit for storing the instruction group;
   a cache storage unit for storing a part of the instruction group stored in the main storage unit; and
   a cache control means for keeping consistency between a content of the cache storage unit and a content of the main storage unit,
   wherein the instruction fetching means fetches the instruction from the cache storage means, and
   wherein the branch instruction updating means updates the set of branch prediction information and the set of branch history information of the branch instruction stored in the cache storage means.

8. The information processing apparatus of claim 4, wherein the branch prediction information updating means generates a new set of branch prediction information indicating "taken" only when the branch history information indicates "very high" and the branch result is "taken", and generates a new set of branch prediction information indicating "not taken" only when the branch history information indicates "very low" and the branch result is "not taken".

9. The information processing apparatus of claim 8, wherein the branch instruction updating means generates a new branch instruction which includes a set of branch prediction information generated by the branch prediction information generating means and a set of branch history information generated by the branch history information generating means, and then overwrites the new branch instruction at a corresponding location in the storage means, wherein the corresponding location stores a source branch instruction of the new branch instruction.

10. The information processing apparatus of claim 9, wherein the storage means includes:
    a main storage unit for storing the instruction group;
    a cache storage unit for storing a part of the instruction group stored in the main storage unit; and
    a cache control means for keeping consistency between a content of the cache storage unit and a content of the main storage unit,
    wherein the instruction fetching means fetches the instruction from the cache storage means, and
    wherein the branch instruction updating means updates the set of branch prediction information and the set of branch history information of the branch instruction stored in the cache storage means.

11. The information processing apparatus of claim 2, wherein the set of branch history information shows that a frequency, with which the branch corresponding to the branch instruction is taken, is "high" or "low".

12. The information processing apparatus of claim 11, wherein the branch history information generating means generates a new set of branch prediction information indicating "high" only when the branch history information included in the branch instruction indicates "low" and the branch result is "taken", and generates a new set of branch prediction information indicating "low" only when the branch history information indicates "high" and the branch result is "not taken".

13. The information processing apparatus of claim 12, wherein the branch prediction information updating means generates a new set of branch prediction information indicating "taken" only when the branch history information indicates "high" and the branch result is "taken", and generates a new set of branch prediction information indicating "not taken" only when the branch history information indicates "low" and the branch result is "not taken".

14. The information processing apparatus of claim 13, wherein the branch instruction updating means generates a new branch instruction which includes a set of branch prediction information generated by the branch prediction information generating means and a set of branch history information generated by the branch history information generating means, and then overwrites the new branch instruction at a corresponding location in the storage means, wherein the corresponding location stores a source branch instruction of the new branch instruction.

15. The information processing apparatus of claim 14, wherein the storage means includes:
    a main storage unit for storing the instruction group;
    a cache storage unit for storing a part of the instruction group stored in the main storage unit; and
    a cache control means for keeping consistency between a content of the cache storage unit and a content of the main storage unit,
    wherein the instruction fetching means fetches the instruction from the cache storage means, and
    wherein the branch instruction updating means updates the set of branch prediction information and the set of branch history information of the branch instruction stored in the cache storage means.

16. The information processing apparatus of claim 1, wherein the set of branch history information shows a branch result for each past execution of a branch instruction including the set of branch history information.

17. The information processing apparatus of claim 16,
    wherein the set of branch history information is composed of 2 bits showing a branch result for a preceding execution and a branch result for two executions previously, and
    wherein the branch history information generating means generates a new set of branch history information using branch results at times of executions of the branch instruction.

18. The information processing apparatus of claim 17, wherein the branch prediction information updating means generates a new set of branch prediction information indicating "not taken" when a branch result at a time of an execution of the branch instruction, a branch result for a preceding execution, and a branch result for two executions previously are "taken", "not taken" and "taken", while generating a new set of branch prediction information indicating "taken" when a branch result at a time of an execution of the branch instruction, a branch result for a preceding execution, and a branch result for two executions previously are "not taken", "taken" and "not taken".

19. The information processing apparatus of claim 18, wherein the branch instruction updating means generates a new branch instruction which includes a set of branch prediction information generated by the branch prediction information generating means and a set of branch history information generated by the branch history information generating means, and then overwrites the new branch instruction at a corresponding location in the storage means, wherein the corresponding location stores a source branch instruction of the new branch instruction.

20. The information processing apparatus of claim 19, wherein the storage means includes:

a main storage unit for storing the instruction group;

a cache storage unit for storing a part of the instruction group stored in the main storage unit; and a cache control means for keeping consistency between a content of the cache storage unit and a content of the main storage unit, wherein the instruction fetching means fetches the instruction from the cache storage means, and wherein the branch instruction updating means updates the set of branch prediction information and the set of branch history information of the branch instruction stored in the cache storage means.

21. A storage medium which stores a program for simulating an operation of a microprocessor that prefetches an instruction by making a branch prediction, the program includes:

an instruction fetching step for fetching an instruction to be executed from the storage means that stores the instruction group including a branch instruction composed of a set of branch prediction information for predicting whether the branch is taken or not taken and a set of branch history information showing past branch results;

an instruction decoding step for decoding whether the fetched instruction is a branch instruction;

a branch prediction step for reading, when the fetched instruction is decoded as a branch instruction, an instruction to be executed in accordance with a set of branch prediction information of the branch instruction;

an executing step for executing the decoded branch instruction;

a branch prediction information generating step for generating a new set of branch prediction information in accordance with branch results when the branch instruction is executed and a set of branch history information included in the branch instruction;

a branch history information generating step for generating a new set of branch history information in accordance with branch results when the branch instructions are executed and a set of branch history information included in the branch instruction; and a branch instruction updating step for updating the set of branch prediction information and the set of branch history information of the branch instruction stored in the storage means to the new set of branch prediction information generated by the branch prediction information generating step and the new set of branch history information generated by the branch history information generating step.

22. A storage medium which stores an instruction group which is to be executed by a computer, wherein the instruction group includes a branch instruction composed of a set of branch prediction information for predicting whether a branch is taken or not taken and a set of branch history information showing past branch results, wherein the branch prediction information shows values generated in accordance with a set of branch history information and a branch result of a branch instruction including the set of branch prediction information at a time of a latest execution by the computer, and wherein the set of branch history information shows values generated in accordance with a set of branch history information and a branch result of a branch instruction including the set of branch history information at a time of a latest execution by the computer, and is a summary of a plurality of past branch results of the branch instruction.

23. A storage medium which stores an instruction group which is executed by a computer, wherein the instruction group includes a branch instruction composed of a set of branch prediction information for predicting whether a branch is taken or not taken and a set of branch history information showing past branch results, wherein the branch prediction information shows values generated in accordance with a set of branch history information and a branch result of a branch instruction including the set of branch prediction information at a time of a latest execution by the computer, and wherein the set of branch history information shows values generated in accordance with a set of branch history information and a branch result of a branch instruction including the set of branch history information at a time of a latest execution by the computer, and shows a branch result for each past branch corresponding to the branch instruction.

* * * * *